United States Patent

[11] 3,575,129

| [72] | Inventor | Herbert D. Sullivan<br>Chicago, Ill. |
| --- | --- | --- |
| [21] | Appl. No. | 781,090 |
| [22] | Filed | Dec. 4, 1968 |
| [45] | Patented | Apr. 13, 1971 |
| [73] | Assignee | International Harvester Company<br>Chicago, Ill. |

[54] ROTATION MONITOR
1 Claim, 3 Drawing Figs.

[52] U.S. Cl. .................................................. 116/57,
116/74, 116/115, 350/96B
[51] Int. Cl. ................................................. B60q 1/54
[50] Field of Search........................................ 73/(Inquired);
116/116, 57, 115, 115.5, 74; 350/27;
356/96 (B)

[56] References Cited
UNITED STATES PATENTS

| 1,532,548 | 4/1925 | Ramsey | 116/57 |
| 2,286,014 | 6/1942 | Rowe | 116/129UX |
| 3,449,036 | 6/1969 | Jacobsen | 350/96(B) |
| 3,466,928 | 9/1969 | Kind | 350/96(B)X |
| 3,461,856 | 8/1969 | Polanyi | 350/96(B)UX |

*Primary Examiner*—Ronald L. Wibert
*Assistant Examiner*—Orville B. Chew, II
*Attorney*—Noel G. Artman

ABSTRACT: An apparatus for indicating to an operator the rotational rate of an element that is located remotely from the operator. A multicolored reflector is secured to the rotating element and a beam of light reflected off said multicolored reflector is transmitted through a fiber optic cable to the operator's station. The operator can by observing the beam of light emitted from the fiber optic cable ascertain the rotational rate of the element.

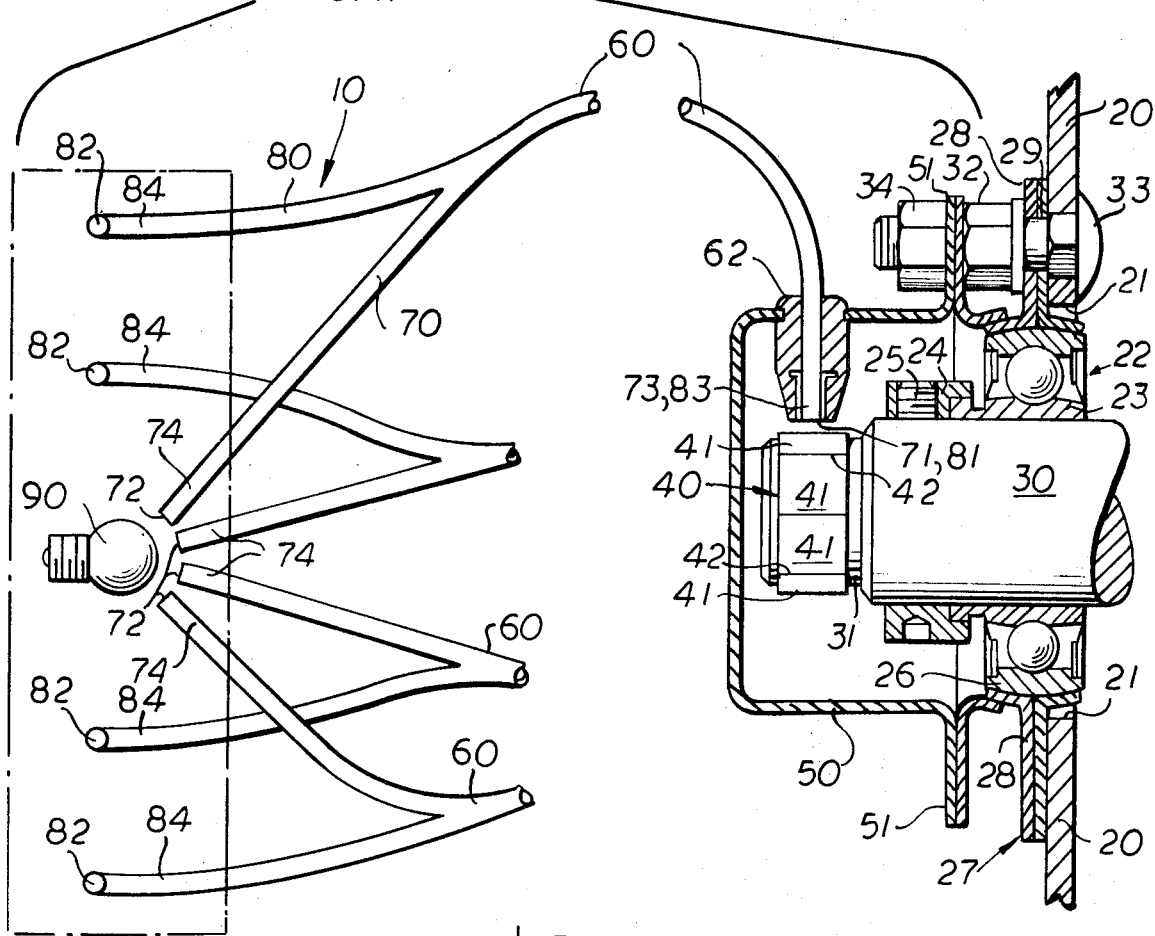
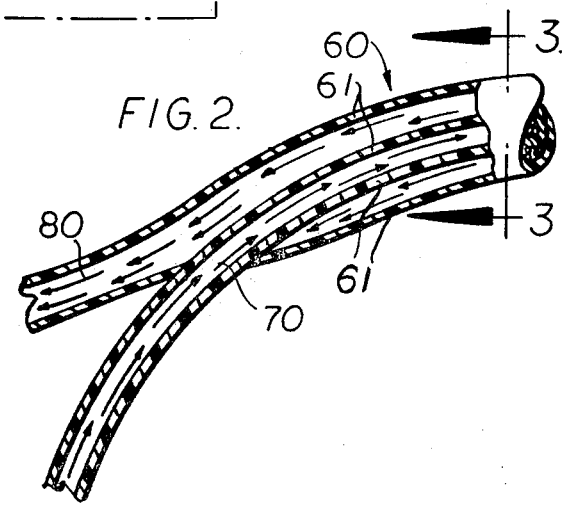
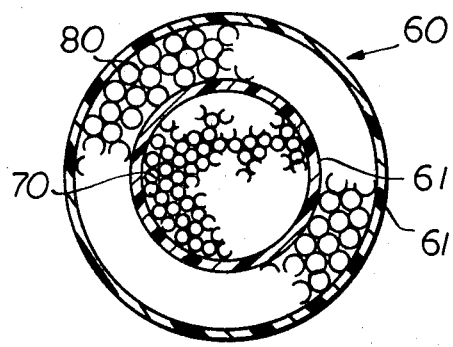
INVENTOR
HERBERT D. SULLIVAN
ATT'Y

ROTATION MONITOR

BACKGROUND OF THE INVENTION

1. Field of the Invention

The present invention relates generally to improvements in rotating shaft indicators and the like and more particularly to a new and improved rotating shaft indicator wherein a beam of light transmitted through a fiber optic cable conveys the information from the rotating element to the operator's station.

2. Description of the Prior Art

This invention was developed for use on a self-propelled combine harvester. In the original self-propelled combines, the operator's platform was exposed to the weather and dust, the operator sat on a hard steel seat and felt every machine vibration through the seat, the steering wheel, the brake and the clutch pedals. The sounds from every moving element of the machine surrounded the operator and the weather conditions left him uncomfortably hot or cold. However, the same factors responsible for his discomfort established an acute rapport between the operator and his machine. There were literally hundreds of machine signals to which the operator could respond automatically. In today's modern self-propelled combines, the operator sits comfortably in an air-conditioned cab where he is insulated from the machine noises, vibrations, odors, and is unable to see the shrouded drives of his machine. Thus the operator no longer has the ability to sense the condition of the various components of the machine. Numerous components of the combine are driven by rotating shafts which under normal conditions have a minimum or prescribed speed range. If the operator can be alerted when one of these rotating shafts stops or slows beyond a critical speed he can take the necessary action and avoid damaging the machine. Electronic monitoring devices have been developed for this purpose which cause the frequency of a flickering light to change in response to the change in the speed of the rotating shaft or to sound a buzzer or light a warning light when a shaft has stopped rotating. Some of the available devices such as the flickering light do not provide sufficient contrast to attract the operator's attention, while others such as the buzzer have been criticized for startling the operator. Devices that startle the operator are undesirable because they create a temptation for the indifferent operators to disconnect the warning system. In a device where a light is either turned on or off to indicate that the shaft is rotating or not rotating, the operator receives no information that the shaft has merely slowed down and it is often too late to prevent damage to the machine after the shaft has completely stopped. Reference may be made to the Swanson U.S. Pat. No. 3,368,214 of Feb. 6, 1968 for a showing of an available monitoring device.

SUMMARY

The general purpose of this invention is to provide a rotating shaft indicator which embraces all the advantages of similarly employed indicators and possesses none of the aforedescribed disadvantages. To attain this the present invention contemplates a unique reflector carried by the rotating shaft which reflects a beam of light that is then transmitted to the operator's station through a flexible optic cable where it can be interpreted by the operator as an indication of shaft speed. The reflector has several colors and thus the reflected beam of light is first one color and then another. The persistence of the human eye is such that it will retain an impression for a fraction of a second. Thus when the eye receives an impression of a red beam of light and while it is retaining this impression it receives the impression of a green beam of light, the observer will not perceive of the red or green beams, but rather will mix the two beams to perceive a yellow light. Time is the critical factor as to whether the individual red and green colors are perceived or whether the blended yellow color is perceived. When the human eye receives approximately 30 sets of red and green impressions per second, the observer will perceive a constant yellow color. As the number of sets per second diminishes, the observer will perceive movement, a flickering, and eventually will recognize the independent red and green colors. It should be noted that the precise speed at which a constant blended color is perceived will vary from individual to individual. The fiber optic cables are constructed such that there is a first light-conducting channel through which a beam of light is aimed at the reflector and a second light-conducting channel through which the reflected beam travels to a location where it can be scrutinized by the operator. The two channels are merged into a single cable at the end adjacent the rotating element that is being monitored. This construction permits locating the light source remote from the rotating element and also locating the light-receiving face of the second light-conducting channel in close proximity to the reflector. An object of the invention is to provide a rotating shaft indicator that will provide sufficient contrast to alert the operator and also enable him to make some judgment as to the speed of the shaft that has fallen below the critical speed but has not yet come to a complete halt.

BRIEF DESCRIPTION OF THE DRAWING

FIG. 1 is a cutaway view of the rotating indicator;

FIG. 2 is a cutaway view of a portion of the optic cable; and

FIG. 3 is a cross-sectional view taken along lines 3-3 of FIG. 2.

DESCRIPTION OF THE PREFERRED EMBODIMENTS

Referring now to the drawings wherein like reference characters designate like or corresponding parts throughout the several views. There is shown in FIG. 1, the revolution indicator designated 10 including a cutaway portion adjacent a rotating shaft or element 30 that will be monitored by the indicator. A supporting wall 20 having an aperture 21 formed therein serves to support a bearing 22 in which the rotating shaft or element 30 is carried. The bearing 22 is made up of an inner race 23 that is secured to the shaft 30 by a retainer 24 and setscrew 25. And an outer race 26 carried by a retainer 27 having a flange 28 formed with apertures 29 therein. The outer race 26 is secured to the supporting wall 20 by nuts 32 and bolts 33, only one of which has been shown in FIG. 1. As illustrated in FIG. 1, the rotating shaft or element 30 is carried by the bearing 22 and has a free end portion 31 that extends through aperture 21 in the supporting wall 20. A multicolored reflector 40 is secured to the free end 31 of the shaft 30. The multicolored reflector 40 includes a plurality of sets 42 of sectors 41. Each of the sectors making up a set is of a different color, for example, a set 42 may include one red sector and one blue sector and the entire multicolor reflector may include three of such sets. A cap-shaped cover 50 envelopes the free end 31 of the shaft 30. The cap 50 has a flange 51 extending radially therefrom and the bolt 33 extends through apertures formed in this flange. Nuts 34 are then used to secure the cap-shaped cover 50 to the supporting wall 20. A grommetlike mount 62 is carried by the cap-shaped cover 50 and functions to support the fiber optic cable 60. The fiber optic cable 60 is made up of a first light-conducting channel 70 and a second light-conducting channel 80. The first light-conducting channel 70 has a light-emitting face 71 at its one end 73 and a light-receiving face 72 at its other end 74. The second light-conducting channel has a light-receiving face 81 at its one end 83 and a light-emitting face 82 at its other end 84. It should be noted that in FIG. 1, the ends 74 and 84 of four separate fiber optic cables 60 are illustrated and only one of the ends 73, 83 of these four cables 60 is illustrated. The other three ends 73, 83 would, of course, go to other shafts to be monitored and it would involve mere duplication to show these.

The two channels 70 and 80 making up each fiber optic cable 60 are merged into a single cable at their ends 73, 83 and a cross-sectional view of this portion of the cable is shown in FIG. 3. It should be noted that an optical insulation material designated 61 separates the fibers of the two channels and also surrounds the outer periphery of the cable. The two channels 70 and 80 of each cable are bifurcated near their end 74, 84 and all of the ends of the first light-conducting channels are fixed such that their light-receiving faces will all be exposed to a single light source 90. The ends 84 of the second light-conducting channels 80 are fixed near the operator's station such that the light-emitting faces 82 can be surveyed by the operator.

The multicolored reflector 40 as illustrated in FIG. 1 is in the form of a band and has four sets 42 of sectors 41. There are two sectors 41 in each of the sets 42. The band-shaped multicolor reflector 40 is constructed such that it is removable. This is done so that reflectors having different numbers of sets 42 and different colors of sectors 41 can be interchanged for each other.

As has been previously stated, the human eye completely mixes the colors when approximately 30 sets per second are seen. Thus if we have a shaft where it is important to know when the speed drops below 300 r.p.m., we would use a reflector having six sets of sectors and thus the viewer would see 1,800 sets per minute or 30 sets per second. If the speed of the shaft drops below 300 r.p.m., the operator will no longer perceive a steady light but rather will notice some movement. As the speed of the shaft continues to diminish, the operator will perceive flickering lights of the actual sector colors. The frequency of the flickering will continue to diminish until the shaft has completely stopped at which time the observer will perceive a constant light, the color of one of the sectors. Since the reflector illustrated in FIG. 1 is made up of four sets of sectors, the operator would observe 30 sets of sectors when the shaft is rotating at a speed of 450 r.p.m. Thus if each set is made up of a red and green sector, when the shaft is rotating at a speed of 450 r.p.m. or faster, the operator would perceive a constant yellow color. If, however, the speed of the shaft fell below 450 r.p.m., he would begin to perceive flickering red and green lights and when the shaft was completely stopped, he would perceive either a constant red or a constant green light. If the critical speed of the shaft in the above example had been 100 r.p.m. rather than 450 r.p.m., then a reflector having 18 rather than four sets would have been used. If the speed for the shaft had been 900 r.p.m. rather than 450 r.p.m., then a reflector having two sets would have been used.

Various color combinations other than red or green can, of course, be used. It should be noted, however, that color mixing of light beams does not follow the rules of pigment mixing. The three primary colors are different and superimposed color beams are added to produce lighter and brighter mixed colors. If all three primary colors are used, the resulting blend is a white light. This characteristic of mixing light beams is responsible for the contrasting colors sufficient to alert the operator.

It should be noted that in this arrangement a single light source is used which can be located at a position where it is convenient to service. The use of a single light source provides the added advantage that when the light source is not operative, the fact is obvious to the operator because all lights on the panel will be inoperative. In a system wherein an individual light source is used for each shaft to be monitored and one of the light sources becomes inoperative, it can go unnoticed because the remaining lights on the operator's panel are operative.

I claim:

1. In a revolution indicator for remotely indicating the speed of a rotating element, comprising a rotating element, a multicolored reflector rotatable in timed relation with said rotating element, located closely adjacent thereto, said reflector having sectors of different colors, said sectors arranged such that during rotation of the rotating element, all sectors move past a common area, a fiber optic cable means having first and second independent light-conducting channels optically insulated from each other:

said first light-conducting channel having a light-emitting face at one end and a light-receiving face at the other end;
   said second light-conducting channel having a light-receiving face at one end and a light-emitting face at the other end wherein a portion of said first and second light-conducting channels merge together at said one ends;
   said one ends of said first and second light-conducting channels disposed in relation to said rotating element such that a light emitted from said first light-conducting channel strikes said light reflector and rebounds into the light-receiving face of said second light-conducting channel a protective cover enclosing said multicolored reflector and said merged ends to shield them from the surrounding environment;
   a light source located adjacent the other end of said first light-conducting channel such that light is received by the light-receiving face;
   said other end of said second light-conducting channel being spaced from said other end of said light-conducting channel and located remote from said rotating element such that a human observer can perceive changes on said light-emitting face as the speed of said rotating elements changes.